(12) United States Patent
Saliba

(10) Patent No.: US 7,487,323 B2
(45) Date of Patent: Feb. 3, 2009

(54) DATA STORAGE SYSTEM FOR STORING DATA IN DIFFERENT TYPES OF DATA STORAGE MEDIA

(75) Inventor: George A. Saliba, Northborough, MA (US)

(73) Assignee: Quantum Corporation, San Jose, CA (US)

( * ) Notice: Subject to any disclaimer, the term of this patent is extended or adjusted under 35 U.S.C. 154(b) by 399 days.

(21) Appl. No.: 11/255,851

(22) Filed: Oct. 21, 2005

(65) Prior Publication Data

US 2006/0090057 A1  Apr. 27, 2006

Related U.S. Application Data

(60) Provisional application No. 60/621,120, filed on Oct. 22, 2004.

(51) Int. Cl.
*G06F 12/00* (2006.01)
(52) U.S. Cl. .................. 711/171; 710/33; 711/114; 711/154
(58) Field of Classification Search ................. 711/171
See application file for complete search history.

(56) References Cited

U.S. PATENT DOCUMENTS

| | | | | |
|---|---|---|---|---|
| 6,104,394 | A * | 8/2000 | Lisle et al. | 715/765 |
| 6,973,534 | B2 * | 12/2005 | Dawson et al. | 711/712 |
| 7,124,124 | B1 | 10/2006 | Saliba | |
| 7,149,754 | B2 * | 12/2006 | Miller et al. | 707/104.1 |
| 2004/0044640 | A1 | 3/2004 | Saliba et al. | |
| 2004/0044641 | A1 | 3/2004 | Saliba | |
| 2004/0133609 | A1 * | 7/2004 | Moore et al. | 707/200 |
| 2005/0038954 | A1 | 2/2005 | Saliba | |
| 2006/0010227 | A1 * | 1/2006 | Atluri | 709/217 |

FOREIGN PATENT DOCUMENTS

| | | |
|---|---|---|
| EP | 1043860 A2 | 10/2000 |
| EP | 1462927 A2 | 9/2004 |
| WO | WO-2004/010304 A1 | 1/2004 |

OTHER PUBLICATIONS

European Search Report mailed on Oct. 17, 2008, for EP 05256488.7 filed on OCt. 19, 2005, 8 pages.

* cited by examiner

*Primary Examiner*—Kevin L Ellis
*Assistant Examiner*—Matthew Bradley
(74) *Attorney, Agent, or Firm*—Morrison & Foerster LLP (57) ABSTRACT

A data storage system for storing data includes a data storage medium and a data interface that communicates with the data storage medium. The data interface is configured to place data into a logical data capsule having a defined size, where the data placed into the logical data capsule can occupy less than the defined size of the logical data capsule. In the data storage system, the logical data capsule is moved as a whole between the data storage medium and the data interface. Additionally, when any data in the logical data capsule is read or modified, all of the data in the logical data capsule is read or modified as a whole. The data interface is configured to assign a capsule number to a logical data capsule within a first range of capsule numbers or a second range of capsule numbers. The first range of capsule numbers corresponds to a first data access time of the first data storage medium. The second range of capsule numbers corresponds to a second data access time of the second data storage medium. The first and second data access times are different

48 Claims, 5 Drawing Sheets

DATA STORAGE SYSTEM FOR STORING DATA IN DIFFERENT TYPES OF DATA STORAGE MEDIA

CROSS REFERENCE TO RELATED APPLICATIONS

This application claims the benefit of earlier filed U.S. Provisional Application Ser. No. 60/621,120, entitled DATA STORAGE SYSTEM FOR STORING DATA IN DIFFERENT TYPES OF DATA STORAGE MEDIA, filed on Oct. 22, 2004, the entire content of which is incorporated herein by reference.

BACKGROUND

1. Field

The present application generally relates to data storage systems, and, in particular, to a data storage system for storing data in different types of data storage media.

2. Related Art

Data can be stored in various types of storage media in different formats. For example, in a conventional format for storing data on a hard disk, the surface of a hard disk platter is divided into a number of tracks and sectors. A track corresponds to a single circular portion of the platter. A sector corresponds to a portion of a track. The data to be stored on the hard disk is divided into pieces such that a single piece can be stored within a single sector. The logical connection between the pieces of the data and the corresponding disk sectors is maintained in a directory. However, over time, as the data is repeatedly read, modified and written to the hard disk, the sectors corresponding to a single file can become scattered over the hard disk. This effect is commonly known as fragmentation, which can produce data access delays.

In a conventional format for storing data on magnetic tape, data is written serially in tracks on the tape. New data or files are appended at the end of previously written data or files, but not elsewhere. This leads to data storage inefficiency and data modification limitations.

Moreover, data may be stored in and transferred among different storage devices, such as a disk drive and a tape drive, depending on factors such as the access history of the data. For example, frequently accessed files may be kept on disk, whereas less frequently used files may be moved from disk to tape, which has a slower access time. In this manner, the disk acts as a cache with respect to the tape.

As described above, however, data is stored on tape in a format different from that of data stored on disk. For example, in conventional systems the host operating system uses a directory to locate the fragmented pieces on disk comprising a file. The host reassembles the pieces into file format before providing the data to a tape drive or before transferring the data over a network to another host where the data would again be reformatted by a storage drive attached to that host for storage according to the formatting requirements of the storage drive. All these operations, of course, add to the time it takes for data to be transferred among storage devices attached to the same host or for a host to access data associated with another host, and wastes valuable host processing and network resources.

SUMMARY

In one exemplary embodiment, a data storage system for storing data includes a data storage medium and a data interface that communicates with the data storage medium. The data interface is configured to place data into a logical data capsule having a defined size, where the data placed into the logical data capsule can occupy less than the defined size of the logical data capsule. In the data storage system, the logical data capsule is moved as a whole between the data storage medium and the data interface. Additionally, when any data in the logical data capsule is read or modified, all of the data in the logical data capsule is read or modified as a whole. The data interface is configured to assign a capsule number to a logical data capsule within a first range of capsule numbers or a second range of capsule numbers. The first range of capsule numbers corresponds to a first data access time of the first data storage medium. The second range of capsule numbers corresponds to a second data access time of the second data storage medium. The first and second data access times are different.

DETAILED DESCRIPTION

Figure 1:
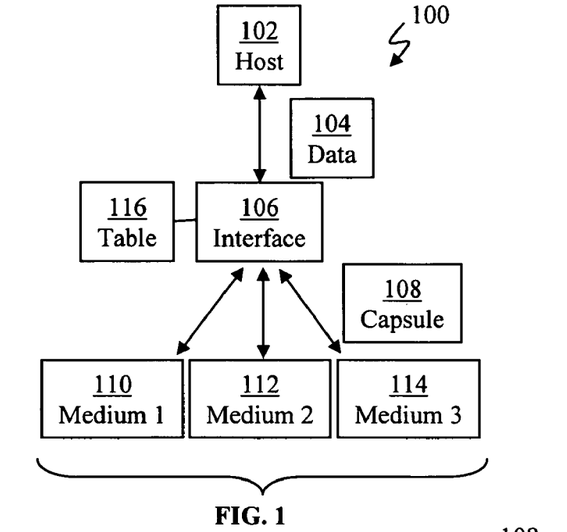
FIG. 1 is a block diagram of an exemplary data storage system.

With reference to FIG. 1, an exemplary data storage system 100 for storing data in different types of data storage media is depicted. In one exemplary embodiment, data storage system 100 includes a data interface 106 that communicates with a plurality of data storage media 110, 112 and 114. Although data storage system 100 is depicted in FIG. 1 in communication with three data storage media 110, 112 and 114, it should be recognized that data storage system 100 can communicate with any number of data storage media, including a single data storage medium.

In the present exemplary embodiment, data storage media 110, 112 and 114 are different types of data storage media having different data access time. For example, data storage medium 110 can be a hard disk, which typically has a data access time in the milliseconds range. Data storage medium 112 can be an optical disk, which typically has a data access time in the seconds range. Data storage medium 114 can be a magnetic tape, which typically has a data access time in the tens of seconds range. It should be recognized that data storage system 100 can include various different types of data storage media with various different access times, such as holography, solid state, and the like. Data storage system 100 can also include a storage drive having multiple types of storage media. For example, for a description of a storage drive having universal format across media types, see U.S. patent application Ser. No. 10/856,970, titled STORAGE DRIVE HAVING UNIVERSAL FORMAT ACROSS MEDIA TYPES, filed May 28, 2004, the entire content of which is incorporated herein by reference.

As depicted in FIG. 1, interface 106 communicates with a host 102 to receive data to be stored and send retrieved data. In particular, interface 106 receives data 104 from host 102 to be stored, or retrieves data 104 requested by host 102. When receiving data 104 to be stored, interface 106 is configured to receive data 104 from host 102, then place 104 into a logical data capsule 108, which is then stored in data storage media 110, 112 or 114. When retrieving data 104, interface 106 retrieves logical data capsule 108 from data storage media 110, 112 or 114, extracts data 104 from logical data capsule 108, and then sends data 104 to host 102.

In the present exemplary embodiment, logical data capsule 108 has a defined size, which can be larger than the size of data 104. Thus, the data placed into logical data capsule 108 can occupy less than the defined size of logical data capsule 108. Additionally, when any portion of data 104 in logical data capsule 108 is read or modified, all of data 104 in logical data capsule 108 is read or modified as a whole. For example, assume data 104 in logical data capsule 108 stored in data storage medium 110 is to be modified. Interface 106 retrieves logical data capsule 108 from data storage medium 110, extracts all of data 104 from logical data capsule 108 as a whole, modifies data 104, places modified data 104 back into logical data capsule 108, and then returns logical data capsule 108 to data storage medium 110.

Additionally, in the present exemplary embodiment, logical data capsule 108 is moved as a whole among interface 106 and data storage media 110, 112 and 114 without reformatting data 104 stored in logical data capsule 108. For example, assume that a logical data capsule 108 that is stored in data storage medium 110 is to be moved to data storage medium 112. Interface 106 retrieves the logical data capsule 108 from data storage medium 110 as a whole, then stores the logical data capsule 108 in data storage medium 112 as a whole without reformatting data 104 in logical data capsule 108.

Figure 2:
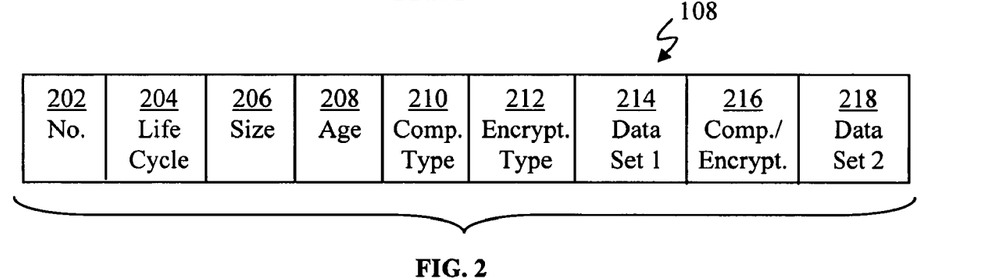
FIG. 2 depicts an exemplary format of an exemplary logical data capsule used in the exemplary data storage system depicted in FIG. 1.

With reference to FIG. 2, exemplary fields of an exemplary logical data capsule 108 are depicted. As depicted in FIG. 2, logical data capsule 108 can include a capsule number field 202, a life cycle field 204, a size field 206, an age field 208, a compression type field 210 associated with a data set number, an encryption type field 212 associated with a data set number, a data set 1 field 214 (that can include compression, encryption or other attributes and size of field set), a compression/encryption field 216, and a data set 2 field 218 (that can include compression, encryption or other attributes and size of field set). It should be recognized, however, that one or more of the fields depicted in FIG. 2 can be omitted from logical data capsule 108, or one or more additional fields can be added to logical data capsule 108. For example, if compression and/or encryption is not performed, compression type field 210 and/or encryption type field 212 can be omitted.

Additional fields can be used to designate different types of data capsules, such empty capsules, defective capsules, full capsules, partially full capsules, and the like. For example, a field can be used to designate that a logical data capsule should be stored in the newest type of storage device. Thus, when a new model of a storage device is available, the logical data capsule is automatically moved to the new model. Similarly, a field can be used to designate that a logical data capsule is a write-once data capsule, which can be written to only once. A write-once data capsule can be used for data security and archive, such as storing medical or legal data. A time stamp and a key for tamper proofing the data can be used to increase the security of the write-once data capsule.

In the present exemplary embodiment, each logical data capsule 108 is assigned a unique capsule number. As depicted in FIG. 2, the assigned capsule number can be stored in capsule number field 202. The size of the unique capsule number used, and thus the size of capsule number field 202, can vary depending on the number of unique capsule numbers to be assigned. For example, a 128 bit capsule number would allow for a total of $3.40 \times 10^{38}$ unique capsule numbers that can be assigned.

Figure 3:
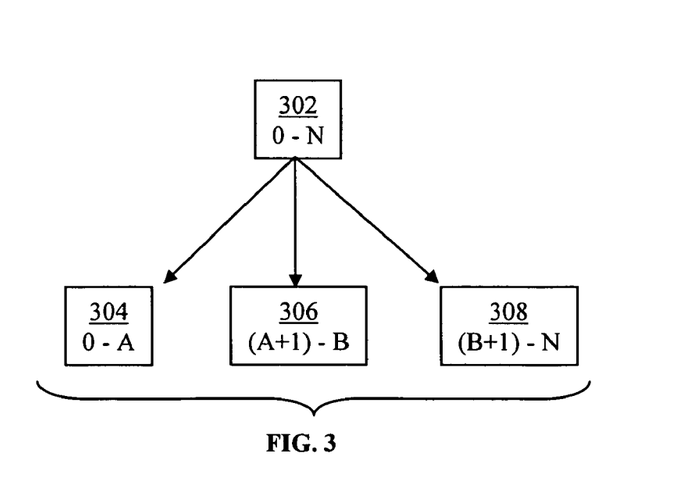
FIG. 3 depicts an exemplary addressing scheme used to assign capsule numbers to logical data capsules.

With reference to FIG. 3, an exemplary addressing scheme to assign the unique capsule numbers is depicted. In the present exemplary embodiment, in accordance with the exemplary addressing scheme, the capsule number of a logical data capsule designates the access time associated with the logical data capsule. Thus, interface 106 (FIG. 1) need not necessarily know the location of the logical data capsule to determine the access time of the logical data capsule. Instead, interface 106 (FIG. 1) can determine the access rate associated with the logical data capsule based on the capsule number assigned to the logical data capsule.

For example, a set of assignable capsule numbers 302 are divided into a plurality of subsets 304, 306 and 308 with different ranges of capsule numbers. In particular, in FIG. 3, a range of capsule numbers 0-N in set 302 are depicted as being divided into subset 304, which is assigned a range of capsule numbers 0-A, subset 106, which is assigned a range of capsule numbers (A+1)-B, and subset 108, which is assigned a range of capsule numbers (B+1)-N. It should be recognized that N, A and B can be any whole, real numbers. For example, assume that N=1,000,000, A=399,999 and B=699,999. Thus, in this example, subset 304 has a range of capsule numbers 0-399,999. Subset 306 has a range of capsule numbers 400,000-699,999. Subset 308 has a range of capsule numbers 700,000-1,000,000. It should be recognized that the division of capsule numbers among subsets 304, 306 and 308 can be even or uneven. Additionally, it should be recognized that set of capsule numbers 302 can be divided into any number of subsets.

In the present exemplary embodiment, subsets 304, 306 and 308 correspond to different access times, and logical data capsules are stored in data storage media with the corresponding access times of the assigned capsule numbers. Thus, the access time and the location of a logical data capsule can be determined based on the capsule number assigned to the logical data capsule. For example, subsets 304, 306 and 308 can corresponds to access times of data storage media 110, 112 and 114 (FIG. 1), respectively. Thus, with reference to FIG. 1, a logical data capsule 108 assigned a capsule number in subset 304 (FIG. 3) is stored in data storage media 110. A logical data capsule 108 assigned a capsule number in subset 306 (FIG. 3) is stored in data storage media 112. A logical data capsule 108 assigned a capsule number in subset 308 (FIG. 3) is stored in data storage media 114.

In the present exemplary embodiment, interface 106 is configured to assign capsule numbers of logical data capsule 108. As described above, interface 106 can determine which data storage media 110, 112 or 114 to store logical data capsule 108 by selecting a capsule number from subsets 304, 306 or 308 (FIG. 3). In particular, interface 106 can stored a new logical data capsule 108 in data storage media 110, 112 or 114 by assigning the new logical data capsule 108 a capsule number selected from subsets 304, 306 or 308 (FIG. 3). For example, interface 306 can store a new logical data capsule 108 in data storage media 112 by assigning the new logical data capsule 108 a capsule number selected from subset 306.

Additionally, interface 106 can also move a logical data capsule 108 from one type of data storage medium having one access time to another type of data storage medium having another access time. For example, interface 106 can move a logical data capsule 108 stored in data storage medium 110 to data storage medium 112 by reassigning the logical data capsule 108 a capsule number from subset 306.

In one exemplary embodiment, data storage media 110, 112 and 114 are components of one or more data storage devices. For example, with reference to FIG. 4, a disk drive device 402 can include disks 404, 406 and 408. A tape drive device 410 can include tapes 412 and 414. A combination data storage device 416 can include a combination of disks 418, 420 and tape 422.

Figure 4:
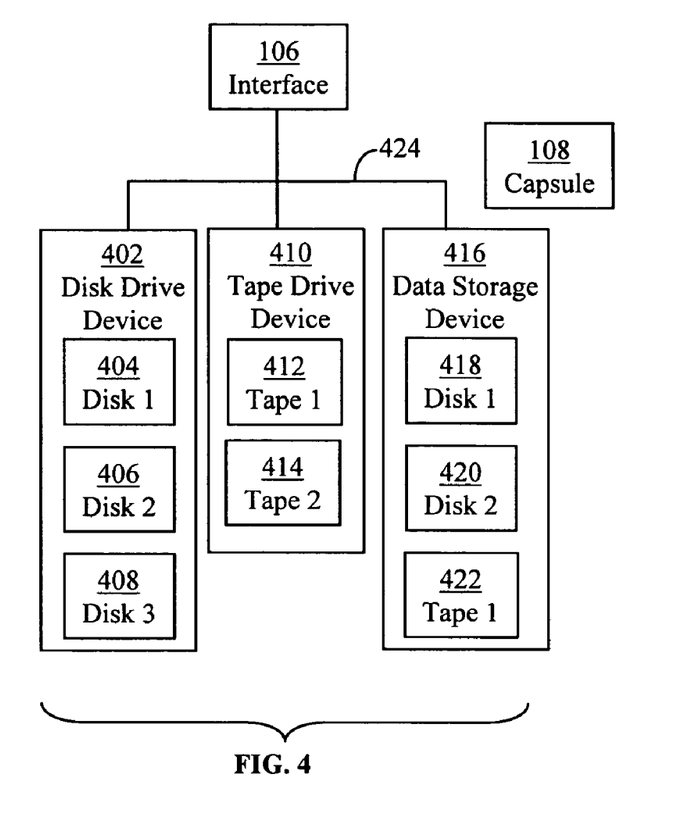
FIG. 4 is a block diagram of exemplary data storage devices connected to an exemplary interface.

In the exemplary embodiment depicted in FIG. 4, interface 106 communicates with disk drive device 402, tape drive device 410 and combination data storage device 416 through a network 424. It should be recognized that interface 106 can communicate with disk drive device A02, tape drive device 410 and combination data storage device 416 through various types and various combinations of types of communication media.

In one exemplary embodiment, the data storage devices (e.g., disk drive device 402, tape device 410 and data storage device 416) provide interface 106 with the range of capsule numbers that can be assigned to store logical data capsules. For example, assume that disk drive device 402 has been assigned a range of capsule numbers, such as 10,100-10,399. Tape drive device 410 has been assigned a range of capsule number, such as 800,000-800,199. Combination data storage device 416 has been assigned a range of capsule numbers for disks 418 and 420, such as 20,300-20,499, and a range of capsule numbers for tape 422, such as 900,000-900,099. Thus, when disk drive device 402 is connected to interface 106, it informs interface 106 that the range of capsule numbers 10,100-10,399 are available to be assigned. When tape drive device 410 is connected to interface 106, it informs interface 106 that the range of capsule numbers 800,000-800, 199 are available to be assigned. When data storage device 416 is connected to interface 106, it informs interface 106 that ranges of capsule number 20,300-20,499 and 900,000-900, 099 are available to be assigned. Because of the addressing scheme described above, interface 106 is aware that these capsule numbers correspond to the access times of disks and tapes.

In one exemplary embodiment, the ranges of capsule numbers assigned to the data storage devices (e.g., disk drive device 402, tape device 410 and data storage device 416) can be universally unique, meaning that no two data storage devices are assigned the same range of capsule numbers. For example, a manufacturer of a data storage device can be provided with unique ranges of capsule numbers. Thus, in this manner, a logical data capsule is assigned a universally unique capsule number.

With reference again to FIG. 1, interface 106 can maintain a table 116 to track the assignment of capsule numbers. In particular, when data 104 is placed in a logical data capsule 108, the correspondence between data 104 and the capsule number of the logical data capsule 108 is maintained in table 116. Thus, because of the addressing scheme described above, the location and the access time of data 104 can be determined by referring to table 116.

In one exemplary embodiment, interface 106 reassigns capsule numbers based on a policy algorithm. For example, interface 106 can reassign capsule numbers based on known caching algorithms. In particularly, interface 106 can reassign capsule numbers of logical data capsules based on their usage. For example, if the usage of a logical data capsule falls below a threshold, interface 106 can reassign the logical data capsule a capsule number corresponding to a slower access time. Conversely, if the usage of a logical data capsule increases above a threshold, interface 106 can reassign the logical data capsule a capsule number corresponding to a faster access time.

In another exemplary embodiment, interface 106 can reassign capsule numbers based on age of the data stored in the logical data capsule. As described above, with reference to FIG. 2, logical data capsule 108 can include an age field 208, which can be used to indicate the age of the data stored in logical data capsule 108. Thus, interface 106 can move logical data capsule 108 among data storage media 110, 112 and 114 based on the age of the data stored in logical data capsule 108. For example, if the age of data stored in a logical data capsule 108 originally stored in date data storage medium 110 exceeds a first threshold, interface 106 can move the logical data capsule 108 to data storage medium 112, which has a slower access time than data storage medium 110, by reassigning the logical data capsule an appropriate capsule number. If the age of the data in the logical data capsule 108 then exceeds a second threshold, interface 106 can move the logical data capsule 108 to data storage 114, which has a slower access time than data storage media 110 and 112, by reassigning the logical data capsule an appropriate capsule number.

Figure 5:
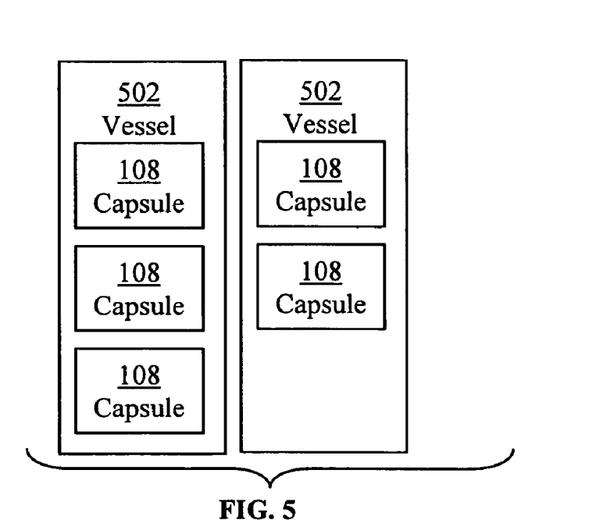
FIG. 5 depicts two or more logical data capsules grouped into one or more logical data vessels.

With reference to FIG. 5, in one exemplary embodiment, interface 106 (FIG. 1) is configured to group logical data capsules 108 into one or more logical data vessels 502. In particular, as depicted in FIG. 5, one logical data vessel 502 includes two or more logical data capsules 108. In the present exemplary embodiment, the logical data capsules 108 in one logical data vessel 502 have substantially the same size and data access time. Interface 106 can be configured to move a logical data capsule 108 from one logical data vessel 502 to another. In the present exemplary embodiment, data corresponding to a single file can be divided into two or more logical data capsules 108 in a single logical data vessel 502. In one application, a single logical data vessel 502 corresponds to a single tape cartridge.

As noted above, in accordance with the exemplary addressing scheme, the capsule number of a logical data capsule designates the access time associated with the logical data capsule. Thus, interface 106 (FIG. 1) need not necessarily know the location of the logical data capsules in a logical data vessel to determine the access times of the logical data capsules. Instead, interface 106 (FIG. 1) can determine the access rates associated with the logical data capsules in a logical data vessel based on the capsule numbers assigned to the logical data capsules.

With reference again to FIG. 1, in one exemplary embodiment, interface 106 can be configured to compress and/or encrypt data 104 to be placed into logical data capsule 108. As described above, with reference to FIG. 2, logical data capsule 108 can include a compression type field 210 and/or an encryption type field 112, which indicate the type of compression and/or encryption used to compress and/or encrypt data 104. It should be recognized that any type of compression and/or encryption can be used to compress and/or encrypt data 104.

Figure 6:
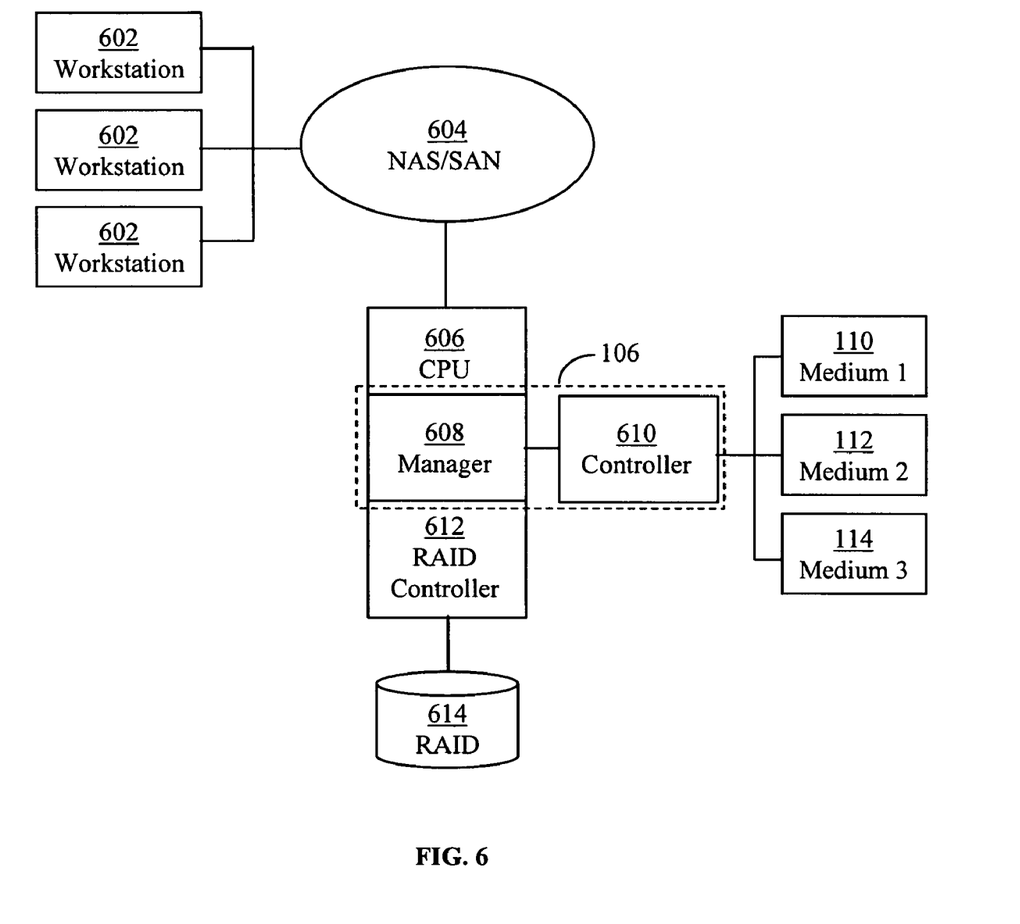
FIG. 6 is a block diagram of an exemplary interface having an manager and an exemplary controller.

With reference to FIG. 6, in one exemplary embodiment, interface 106 is implemented in a data storage system connected to a network attached storage/storage area network (NAS/SAN) 604. In particular, workstations 602 and central processing unit (CPU) 606 are attached to NAS/SAN 604. CPU 606 receives from workstations 602 data to be stored and requests for data to be retrieved. In the exemplary embodiment depicted in FIG. 6, redundant array of independent/inexpensive disks (RAID) controller 612 and RAID 614 operate as the primary data storage. Interface 106 and data storage media 110, 112 and 114 function as the secondary data storage.

As depicted in FIG. 6, interface 106 can include a manager 608 and controller 610. In the present exemplary embodiment, manager 608 is implemented as software that communicates with CPU 606 to receive requests to store and retrieve data. Controller 610 is implemented as hardware that communicates with manager 608 and data storage media 110, 112 and 114. Controller 610 operates under the control and command of manager 608. Controller 610 creates new logical data capsules, assigns capsule numbers, and moves logical data capsules among data storage media 110, 112 and 114. It should be recognized that manager 608 and controller 610 can reside in the same unit or separate units.

It should be recognized that interface 106 and in particular manger 608 and controller 610 can be physically located in any location in NAS/SAN 604 and not necessarily physically co-located with CPU 606 or RAID controller 612. Manager 608 and controller 610 can also be located physically apart from each other in NAS/SAN 604 in addition to being physically co-located. Manager 608 and controller 610 can be physically located within a single unit or separately in multiple units connected to NAS/SAN 604.

Figure 7:
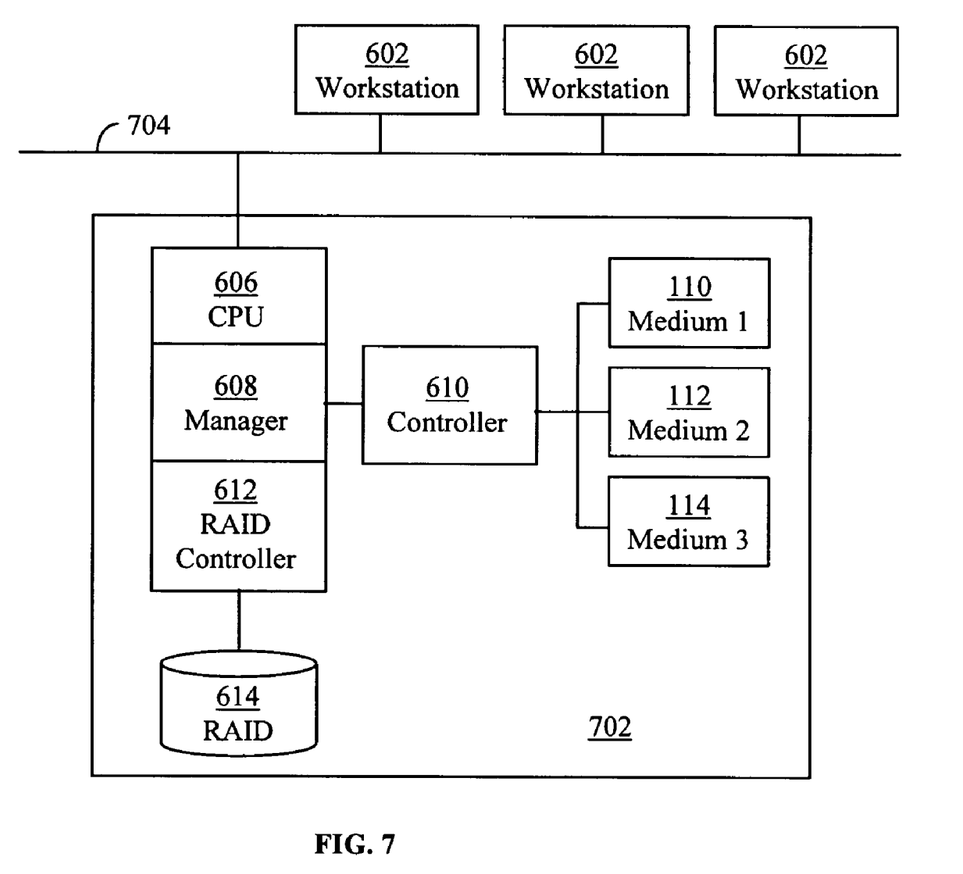
FIG. 7 is a block diagram of the exemplary manager and controller depicted in FIG. 6 as components in a network attached storage (NAS) unit.

With reference to FIG. 7, in one exemplary embodiment, manager 608 and controller 610 are implemented in the same unit in a NAS environment. In the present exemplary embodiment, manager 608 and controller 610 are components of a NAS unit 702. As depicted in FIG. 7, NAS unit 702 includes data storage media 110, 112 and 114, CPU 606, RAID controller 612, and RAID 614. NAS unit 702 can be connected to a local area network (LAN) 704 to which workstations 602 are also connected. Thus, NAS unit 702 can operate as a server on LAN 704 to provide primary and secondary data storage to workstations 602. It should be recognized that NAS unit 702 can be scaled to any desirable size by adjusting the size and number of RAID 614 and/or data storage media 110, 112 and 114.

Figure 8:
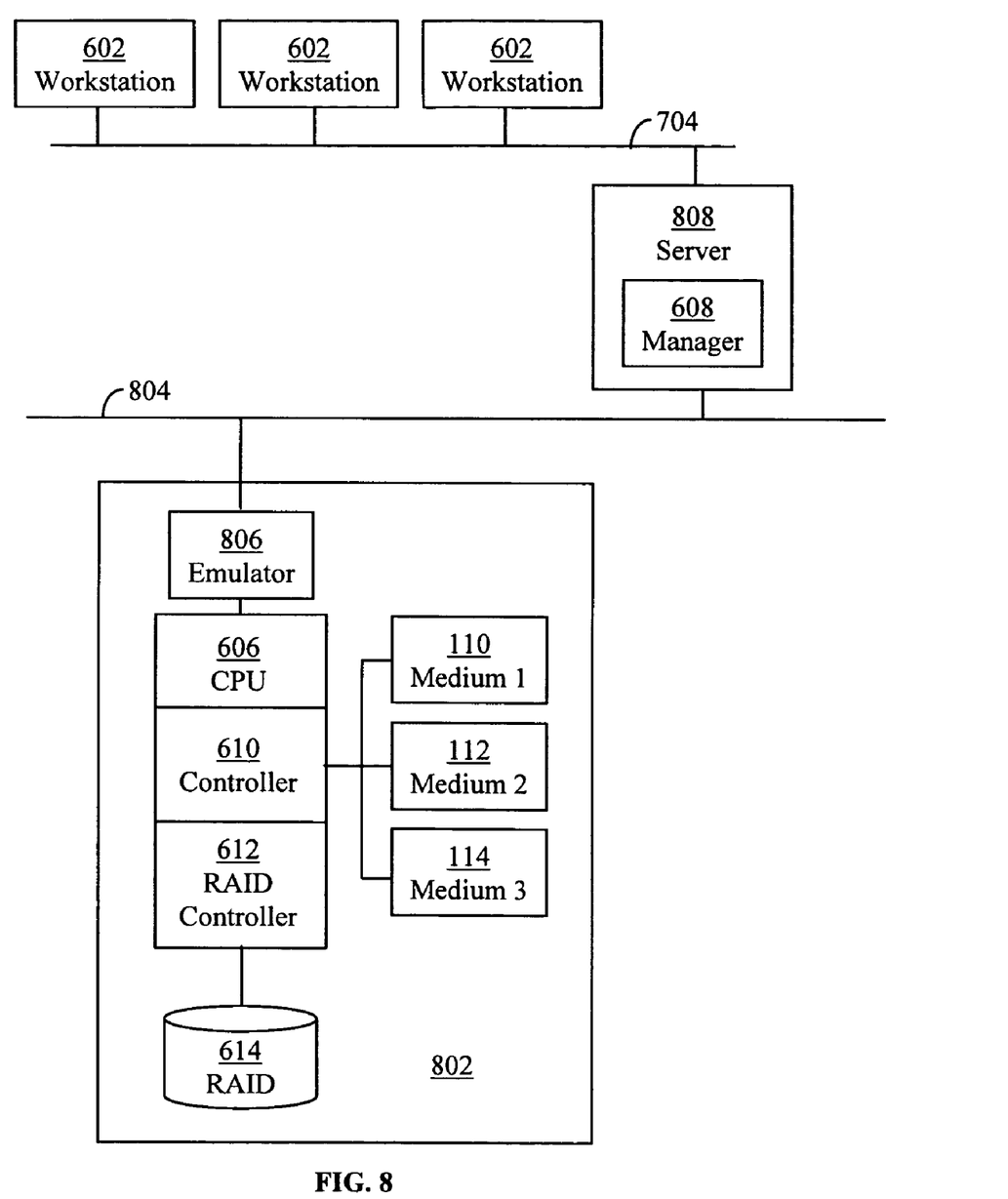
FIG. 8 is a block diagram of the exemplary manager depicted in FIG. 6 as a component in a server attached to a local area network (LAN) and the exemplary controller depicted in FIG. 6 as a component in a storage area network (SAN) unit.

With reference to FIG. 8, in one exemplary embodiment, manager 608 and controller 702 are implemented in separate units in a SAN environment. In the present exemplary embodiment, manager 608 is a component in a server 808, and controller 610 is a component of SAN unit 802. As depicted in FIG. 8, SAN unit 802 includes data storage media 110, 112 and 114, CPU 606, RAID controller 612, and RAID 614. SAN unit 802 also includes an emulator 806, which allows SAN unit 802 to connected to and operate on SAN 804 as a data storage device. As depicted in FIG. 8, server 808 is connected to SAN 804 and to LAN 704 to which workstations 602 are also connected. Thus, SAN unit 802 can operate as a data storage device on SAN 804 to provide primary and secondary data storage to workstations 602. It should be recognized that SAN unit 802 can be scaled to any desirable size by adjusting the size and number of RAID 614 and/or data storage media 110, 112 and 114.

Although various exemplary embodiments have been described, it will be appreciated that various modifications and alterations may be made by those skilled in the art. For example, with reference to FIG. 1, exemplary data storage system 100 can include one type of data storage medium, such as a hard disk in a disk drive. Logical data capsules 108 having equivalent sizes and compressed data can be used in the drive. Such a drive would have the advantages of not suffering from fragmentation and the benefits of data compression (e.g., faster access time and increased capacity).

What is claimed is:

1. A data storage system for storing data in different types of data storage media, the system comprising:
    a data interface that communicates with a first data storage medium and a second data storage medium, the first and second data storage media being different types of storage media having different data access times,
    wherein the data interface is configured to place data into a logical data capsule having a defined size,
    wherein the data placed into the logical data capsule can occupy less than the defined size of the logical data capsule,
    wherein the logical data capsule is moved as a whole among the first data storage medium, the second data storage medium and the data interface without reformatting the data in the logical data capsule, and
    wherein when any data in the logical data capsule is read or modified, all of the data in the logical data capsule is read or modified as a whole
    wherein the data interface is configured to assign a capsule number to a logical data capsule within a first range of capsule numbers or a second range of capsule numbers, wherein the first range of capsule numbers corresponds to a first data access time of the first data storage medium, and wherein the second range of capsule numbers corresponds to a second data access time of the second data storage medium, and wherein the first and second data access times are different.

2. The data storage system of claim 1, wherein the data interface is configured to reassign the capsule number of the logical data capsule to move the logical data capsule between the first and second data storage media.

3. The data storage system of claim 2, wherein the capsule number of the logical data capsule is reassigned based on usage of the data in the logical data capsule.

4. The data storage system of claim 2, wherein the capsule number of the logical data capsule is reassigned based on an age associated with the data in the logical data capsule.

5. The data storage system of claim 1, wherein the first data storage medium is a hard disk, and wherein the second data storage medium is a magnetic tape.

6. The data storage system of claim 1, wherein the data interface is configured to assign a capsule number to the logical data capsule within a third range of capsule numbers, wherein the third range of capsule numbers corresponds to a third data access time different from the first and second data access times.

7. The data storage system of claim 6, further comprising: a third data storage medium that operates at the third data access time, wherein the data interface communicates with the third data storage medium.

8. The data storage system of claim 7, wherein the first data storage medium is a hard disk, wherein the second data storage medium is a magnetic tape, and wherein the third data storage medium is an optical disk.

9. The data storage system of claim 6, wherein the data interface is configured to reassign the capsule number of the logical data capsule to move the logical data capsule among the first, second and third data storage Media, and wherein the capsule number of the logical data capsule is reassigned based on usage of the data in the logical data capsule.

10. The data storage of claim 6, wherein the data interface is configured to reassign the capsule number of the logical data capsule to move the logical data capsule among the first, second and third data storage media, and wherein the capsule number of the logical data capsule is reassigned based on an age associated with the data in the logical data capsule.

11. The data storage system of claim 1, wherein the data interface is configured to group logical data capsules into logical data vessels, wherein one logical data vessel includes two or more logical data capsules corresponding to substantially the same data access time.

12. The data storage system of claim 11, wherein data corresponding to a single file is divided into two or more logical data capsules in a single logical data vessel.

13. The data storage system of claim 11, wherein a logical data vessel corresponds to a single tape cartridge.

14. The data storage system of claim 11, wherein the data interface is configured to move a logical data capsule among logical data vessels.

15. The data storage system of claim 1, further comprising:
a first storage device, wherein the first data storage medium is a component of the first storage device;
a second storage device, wherein the second data storage medium is a component of the second storage device; and
a network connecting the first storage device, the second storage device, and the data interface.

16. The data storage system of claim 1, wherein the data interface comprises a manager and a controller.

17. The data storage system of claim 16, wherein the manager comprises software and the controller comprises hardware.

18. The data storage system of claim 16, wherein the manager and the controller are components in a network attached storage (NAS) unit, wherein the NAS unit is connected to a local area network (LAN).

19. The data storage system of claim 18, wherein the NAS unit includes:
a central processing unit;
a redundant array of independent/inexpensive disks (RAID);
a RAID controller; and
the first and second data storage media.

20. The data storage system of claim 16, wherein the manager is a component of a server connected to a local area network (LAN) and a storage area network (SAN), and wherein the controller is a component in a SAN unit connected to the SAN.

21. The data storage system of claim 20, wherein the SAN unit includes:
an emulator
a central processing unit;
a redundant array of independent/inexpensive disks (RAID);
a RAID controller; and
the first and second data storage media.

22. The data storage system of claim 1, wherein the data placed into the logical data capsule is compressed data.

23. The data storage system of claim 1, wherein the data placed into the logical data capsule is encrypted data.

24. A method of storing data in different types of data storage media, the method comprising:
placing data in a logical data capsule at a date interface, the logical data capsule having a defined size, wherein the data placed into the logical data capsule can occupy less than the defined size of the logical data capsule;
storing the logical data capsule in a first data storage medium or a second data storage medium, wherein the first and second data storage media are different types of storage media having different data access times;
moving the logical data capsule as a whole among the first data storage medium, the second data storage medium and the data interface without reformatting the data in the logical data capsule;
when the data in the logical data capsule is read or modified, reading or modifying all of the data in the logical data capsule as a whole; and
assigning at the data interface a capsule number to the logical data capsule within a first range of capsule numbers or a second range of capsule numbers, wherein the first range of capsule numbers corresponds to a first data access time of the first data storage medium, wherein the second range of capsule numbers corresponds to a second data access time of the second data storage medium, and wherein the first and second data access times are different.

25. The method of claim 24, further comprising:
reassigning at the data interface the capsule number of a logical data capsule to move the logical data capsule between the first and second data storage media.

26. The method of claim 25, wherein the capsule number of the logical data capsule is reassigned based on usage of the data in the logical data capsule.

27. The method of claim 25, wherein the capsule number of the logical data capsule is reassigned based on an age associated with the data in the logical data capsule.

28. The method of claim 24, wherein the first data storage medium is a hard disk, and wherein the second data storage medium is a magnetic tape.

29. The method of claim 24, wherein the capsule number assigned to a logical data capsule is within the first range of capsule numbers, the second range of capsule numbers, or a third range of capsule numbers, wherein the third range of capsule numbers corresponds to a third data access time different from the first and second data access times.

30. The method of claim 29, wherein a third data storage medium operates at the third data access time, wherein the data interface communicates with the third data storage medium.

31. The method of claim 30, wherein the first data storage medium is a hard disk, wherein the second data storage medium is a magnetic tape, and wherein the third data storage medium is an optical disk.

32. The method of claim 30, further comprising: reassigning the capsule number of the logical data capsule to move the logical data capsule among the first, second and third data storage media, and wherein the capsule number of the logical data capsule is reassigned based on usage of the data, in the logical data capsule.

33. The method of claim 30, further comprising:
reassigning the capsule number of the logical data capsule to move the logical data capsule among the first, second and third data storage media, and wherein the capsule number of the logical data capsule is reassigned based on an age associated with the data in the logical data capsule.

34. The method of claim 24, further comprising:
grouping logical data capsules into logical data vessels, wherein one logical data vessel includes two or more logical data capsules corresponding to substantially the same data access time.

35. The method of claim 34, further comprising:
dividing data corresponding to a single file into two or more logical data capsules in a single logical data vessel.

36. The method of claim 34, wherein a logical data vessel corresponds to a single tape cartridge.

37. The method of claim 34, further comprising:
moving a logical data capsule among logical data vessels.

38. The method of claim 24, further comprising:
a first storage device, wherein the first data storage medium is a component of the first storage device;
a second storage device, wherein the second data storage medium is a component of the second storage device; and
a network connecting the first storage device, the second storage device, and the data interface.

39. The method of claim 24, wherein the data interface comprises a manager and a controller.

40. The method of claim 39, wherein the manager is software and the controller is hardware.

41. The method of claim 39, wherein the manager and the controller are components in a network attached storage (NAS) unit, wherein the NAS unit is connected to a local area network (LAN).

42. The method of claim 41, wherein the NAS unit includes:
a central processing unit;
a redundant array of independent/inexpensive disks (RAID);
a RAID controller; and
the first and second data storage media.

43. The method of claim 39, wherein the manager is a component of a server connected to a local area network (LAN) and a storage area network (SAN), and wherein the controller is a component in a SAN unit connected to the SAN.

44. The method of claim 43, wherein the SAN unit includes:
an emulator
a central processing unit;
a redundant array of independent/inexpensive disks (RAID);
a RAID controller; and
the first and second data storage media.

45. The method of claim 24, further comprising:
compressing the data to be placed into the logical data capsule.

46. The method of claim 24, further comprising:
encrypting the data to be placed into the logical data capsule.

47. A method of optimizing the reading or modifying of data stored in a magnetic tape, the method comprising:
placing data in a logical data capsule at a data interface, the logical data capsule having a defined size, wherein the data placed into the logical data capsule can occupy less than the defined size of the logical data capsule;
storing the logical data capsule in a hard disk or a magnetic tape, wherein the hard disk and magnetic tape have different data access times;
moving the logical data capsule as a whole among the hard disk, the magnetic tape and the data interface without reformatting the data in the logical data capsule;
when the data in the logical data capsule is read or modified, reading or modifying all of the data in the logical data capsule as a whole; and
assigning at the data interface a capsule number to the logical data capsule within a first range of capsule numbers or a second range of capsule numbers, wherein the first range of capsule numbers corresponds to a first data access time of the hard disk, wherein the second range of capsule numbers corresponds to a second data access time of the magnetic tape, and wherein the first and second data access times are different.

48. A computer-readable storage medium having computer executable instructions for causing a computer to store data in different types of data storage media, comprising instructions for:
placing data in a logical data capsule, the logical data capsule having a defined size, wherein the data placed into the logical data capsule can occupy less than the defined size of the logical data capsule;
storing the logical data capsule in a first data storage medium or a second data storage medium, wherein the first and second data storage media are different types of storage media having different data access times;
moving the logical data capsule as a whole among the first data storage medium, the second data storage medium and a data interface without reformatting the data in the logical data capsule;
when the data in the logical data capsule is read or modified, reading or modifying all of the data in the logical data capsule as a whole; and
assigning at the data interface a capsule number to the logical data capsule within a first range of capsule numbers or a second range of capsule numbers, wherein the first range of capsule numbers corresponds to a first data access time of the first data storage medium, wherein the second range of capsule numbers corresponds to a second data access time of the second data storage medium, and wherein the first and second data access times are different.

* * * * *